United States Patent
Horiuchi et al.

(10) Patent No.: US 6,752,019 B2
(45) Date of Patent: Jun. 22, 2004

(54) VIBRATION TESTING APPARATUS AND VIBRATION TESTING METHOD

(75) Inventors: Toshihiko Horiuchi, Ushiku (JP); Kazuhiro Umekita, Tsuchiura (JP); Yoshihiro Dozono, Chiyoda (JP); Takao Konno, Minori (JP)

(73) Assignee: Hitachi Industries Co., Ltd., Tokyo (JP)

( * ) Notice: Subject to any disclaimer, the term of this patent is extended or adjusted under 35 U.S.C. 154(b) by 0 days.

(21) Appl. No.: 10/358,262

(22) Filed: Feb. 5, 2003

(65) Prior Publication Data

US 2003/0172739 A1 Sep. 18, 2003

(30) Foreign Application Priority Data

Mar. 15, 2002 (JP) .......................................... 2002-071191

(51) Int. Cl.[7] .................................................. G01M 7/02
(52) U.S. Cl. ............................................. 73/664; 702/33
(58) Field of Search ..................... 73/662–672; 702/56, 702/33, 35, 30

(56) References Cited

U.S. PATENT DOCUMENTS 5,388,056 A * 2/1995 Horiuchi et al. ............... 702/56
5,737,239 A 4/1998 Horiuchi et al. ............... 73/662
6,189,385 B1 2/2001 Horiuchi et al. ............... 73/664
6,341,258 B1 * 1/2002 Inoue et al. .................... 702/56
2002/0042667 A1 4/2002 Momoi et al. .................. 700/280

FOREIGN PATENT DOCUMENTS

| JP | 08-292122 | | 5/1996 | |
| JP | 09-126942 | | 5/1997 | |
| JP | 2000121488 A | * | 4/2000 | ............ G01M/7/02 |
| WO | WO 9841835 A1 | * | 9/1998 | ............ G01M/7/02 |

OTHER PUBLICATIONS

Kobayashi et al., First Earthquake Disaster Prevention Symposium, pp. 145–150 (Mar. 2000).
Takahashi et al., First Earthquake Disaster Prevention Symposium, pp. 151–156 (Mar. 2000).

* cited by examiner

*Primary Examiner*—Hezron Williams
*Assistant Examiner*—Rose M. Miller
(74) *Attorney, Agent, or Firm*—Crowell & Moring LLP

(57) ABSTRACT

In a hybrid vibration experiment of the structure, while shaking an actual model simulating a portion of the structure, vibration response analysis of a numerical model simulates the remaining portions of the structure using a computer. Loading members are provided neighboring the actual model. A plurality of vibrators vibrates the actual model through the loading members. The vibrators are controlled so that, not a point displacement but, a distributed displacement is loaded on the actual model.

9 Claims, 7 Drawing Sheets

PLAN VIEW

AA CROSS-SECTION

PLAN VIEW

VERTICAL VIEW

VIBRATION TESTING APPARATUS AND VIBRATION TESTING METHOD

BACKGROUND OF THE INVENTION

The present invention relates to a vibration testing apparatus and a vibration testing method for conducting hybrid vibration experiments on structures.

A method is described of conducting vibration experiment by using a shaking table, by numerically modeling a part of the structure while building up an actual model for the remaining parts thereof, for determining behavior of the structure when being subjected to an earthquake or the like, for example, in "A hybrid vibration experiment with using a model of soil-foundation system" by KOBAYASHI and TAMURA, Articles of a first ($1^{st}$) symposium relating to an improvement on protection against the earthquake disaster upon the basis of analysis of breaking process of structures, Mar. 27, 2000, issued by a technology propelling organization of civil engineering society, pp. 145–150. This method is based on the condition that concentrated load is applied onto a vibration point. However, with a structure that cannot be easily divided into numerical and actual models, the displacement is distributed, which is inherently ought to be given on the boarder between both of those models; therefore it is difficult to determine such displacement with high accuracy by using only a single vibrator.

For overcoming such a drawback, Japanese Patent Laying-Open No. Hei 8-292122 (1996) or Japanese Patent Laying-Open No. Hei 9-126942 (1997), for example, describe that deformation of a great degree of freedom is applied onto the model as a target of vibration with using a large number of the vibrators. For example, in the Japanese Patent Laying-Open No. Hei 8-292122 (1996), a plurality of vibrating or shaking tables of the same size are positioned, being separated by such a predetermined distance therebetween, such that each the shaking table can be moved in synchronism therewith and moved independently, and that each the shaking table can be moved while keeping the correlation therebetween, thereby enabling them to be used, also as a shaking table of a large-size.

Also, in the Japanese Patent Laying-Open No. Hei 9-126942 (1997), for enabling to give a plurality of vibrations having a phase difference therebetween, or those being different in the cycle thereof, both a sample and a second vibrating stage are received within a first vibrating stage, being formed in a box-like shape and opened at the upper surface thereof, in a vibration tester. The second vibrating stage takes counterforce to the first vibrating stage, thereby enabling vibrations different from that given from the first vibrating stage onto the sample disposed thereon.

Further, for the purpose of complementing the method of the first-mentioned document, in "Dynamic-response analysis of bridge by taking coupling of soil-foundation into consideration" by TAKAHASHI, and others, Articles of a first ($1^{st}$) symposium relating to an improvement on protection against the earthquake disaster upon the basis of analysis of breaking process of structures, Mar. 27, 2000, issued by a technology propelling organization of civil engineering society, pp. 151–156, a lumped mass model is used in the hybrid experiment, in which the structure is considered to be a non-linear element.

In what is described in the first-mentioned document, enabling the hybrid vibration experiments therewith, the numerical model and the actual model are divided on the boundary therebetween, ideally by a point. Accordingly, it is only possible to treat the general structure, which shows complex behaviors, in an approximate manner; therefore a modeling is desired that is closer to reality. Also, with those described in the Japanese Patent Laying-Open No. Hei 8-292122 (1996) and the Japanese Patent Laying-Open No. Hei 9-126942 (1997), though having an advantage that the sample can be vibrated at a plurality of points, however there is paid almost no consideration to how the bad influences should be reflected on the structure of the vibrator, in particular, when the vibration response of the structure greatly depends on the peripheral circumferences. For example, a load is applied from a soil onto a pile of the bridge, which is buried into the soil, and this load depends on the deformation of the pile. Also, the structure receives fluctuation pressure from winds, and this fluctuation pressure may be a factor of vibration generation. Thus, the fluctuation pressure is influenced by the deformation of the structure. Also the same phenomenon occurs within the structure in water.

Moreover, since the non-linear lumped mass model is used as the calculation model in the second-mentioned document, the accuracy of calculation can be improved; however, since it also tries to achieve the vibration displacement distribution of the actual model by using the single vibrator, therefore a further improvement is desired for the purpose of obtaining the actual displacement distribution with higher fidelity.

BRIEF SUMMARY OF THE INVENTION

According to the present invention, being accomplished by taking the drawbacks of the conventional arts mentioned above into the consideration, an object is to make the so-called hybrid vibration experiment possible on the structure in a wide region thereof. Another object, according to the present invention, is to bring the method for vibration experiment to be executed accompanying with the shaking tests and numeral calculations to be applicable also onto the structure being difficult to be divided by the point and the structure receiving ill influences from the peripheral circumstances thereof. A still further object, according to the present invention, is to accomplish a hybrid vibration experimental apparatus, being applicable to structures widely, and also a vibration-response analysis apparatus for use therein. And, according to the present invention, it is an object to achieve one or more of those objects.

For accomplishing the objects mentioned above, according to the present invention, there is provided a vibration testing apparatus, for analyzing vibration response in a structure by using a computer, shaking a portion of the structure with using an actual model simulated thereto, while analyzing the vibration response of a numerical model simulated to remaining portions thereof The apparatus has a loading member neighboring the actual model; a plurality of vibrators for shaking the actual model through the loading member; and a control for the plurality of vibrators, wherein the control controls the plurality of vibrators, so that a load is applied onto the actual model causing distributed displacement thereupon.

Also, according to the present invention, in the vibration testing apparatus as described in the above, it is preferable that the control apparatus controls the plurality of vibrators upon the distributed displacement, which is memorized or stored in the computer in advance, and that a displacement detector is provided in each of the plurality of vibrators for detecting shaking displacements by the vibrators.

Further, according to the present invention, for accomplishing another object mentioned above, there is also provided a hybrid vibration testing apparatus having a deformation loading apparatus for deforming a sample; and a computer for calculating vibration response in a structure model, which is imaginarily connected to the sample, and for giving an instructing to the deformation loading device, thereby causing the deformation in the sample. The deformation loading device includes a loading member neighboring the sample and causing the deformation in the sample through deformation of itself; a plurality of vibrators for causing the deformation in the loading member, each being fixed at one end thereof; and counterforce measurement apparatuses, each for measuring the counterforce, which the sample gives to the loading apparatus. The computer calculates out the vibration response in a structure model by using a distributed counterforce value detected by the counterforce measurement apparatus and an external force applied onto the structure model. The vibration response is a vibration response having a greater degree of freedom than that of the vibrators, and the computer further instructs a displacement amount to each of the vibrators upon basis of the vibration response calculated out therein.

Also, in the hybrid vibration testing apparatus as described above, it is preferable that the computer instructs the displacement amount to each of said vibrators, so that the deformation caused in the loading member by shaking of the vibrators coincides with the deformation of the loading member, which is included in the vibration response calculated out through the structure model. It is also contemplated that the computer calculates out the displacement amount to be instructed to each of said vibrators, using a least squares method.

Also, it is preferable that that the counterforce measurement apparatus is built up with load sensors, each of which is provided between the loading member and the sample, respectively, and the computer obtains a distributed counterforce by interpolating outputs of those load sensors. Also, it may further comprises apparatus for executing at least one of storing, displaying and outputting of the vibration response calculated by the computer, during vibration experiment or after completion thereof.

Further, it is contemplated that the counterforce measurement apparatus is built up with load sensors, each of which is provided between the loading member and the sample, respectively, and a loading member structure model is loaded into the computer, which model describes a relationship of deformation amount with respect to the load on the loading member at a connecting point between the loading member and the vibrator.

Moreover, according to the present invention, for accomplishing one of the objects mentioned above, there is also provided a hybrid vibration testing method, for analyzing vibration response in the entire structure by using a computer, shaking a portion thereof with using an actual model simulated thereto, while analyzing the vibration response of a numerical model simulated to remaining portions thereof. The method involves calculating the vibration response of the numerical model at a time when at least one of external force and shaking force is applied onto the structure; and applying a load to cause the distributed displacement on a loading member, which is neighbors the actual model, by using a plurality of vibrators, upon the basis of vibration displacement at a neighboring portion to said actual model, which is obtained in the computer. And in the hybrid vibration testing method as described above, it is contemplated that the external force is considered to be an inertia caused due to earthquake, and the vibration responses obtained are considered seismic responses caused by seismic acceleration.

And also, according to the present invention, in the hybrid vibration testing method as described above, it is currently preferable that the distributed counterforce is obtained by memorizing a loading member structure model describing a relationship between the load and the deformation amount, at positions where the vibrators are connected, into the computer; calculating the counterforce generated in the loading member by the computer, using the deformation amount, which is applied by each of vibrators, and the loading member structure model; obtaining a difference in the load by subtracting the counterforce calculated by the computer from the load value detected by the load detector provided in each of the vibrators; and obtaining the distributed counterforce of an entire loading member which causes the distributed deformation from the load of the difference in each of the vibrators.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Figure 1:
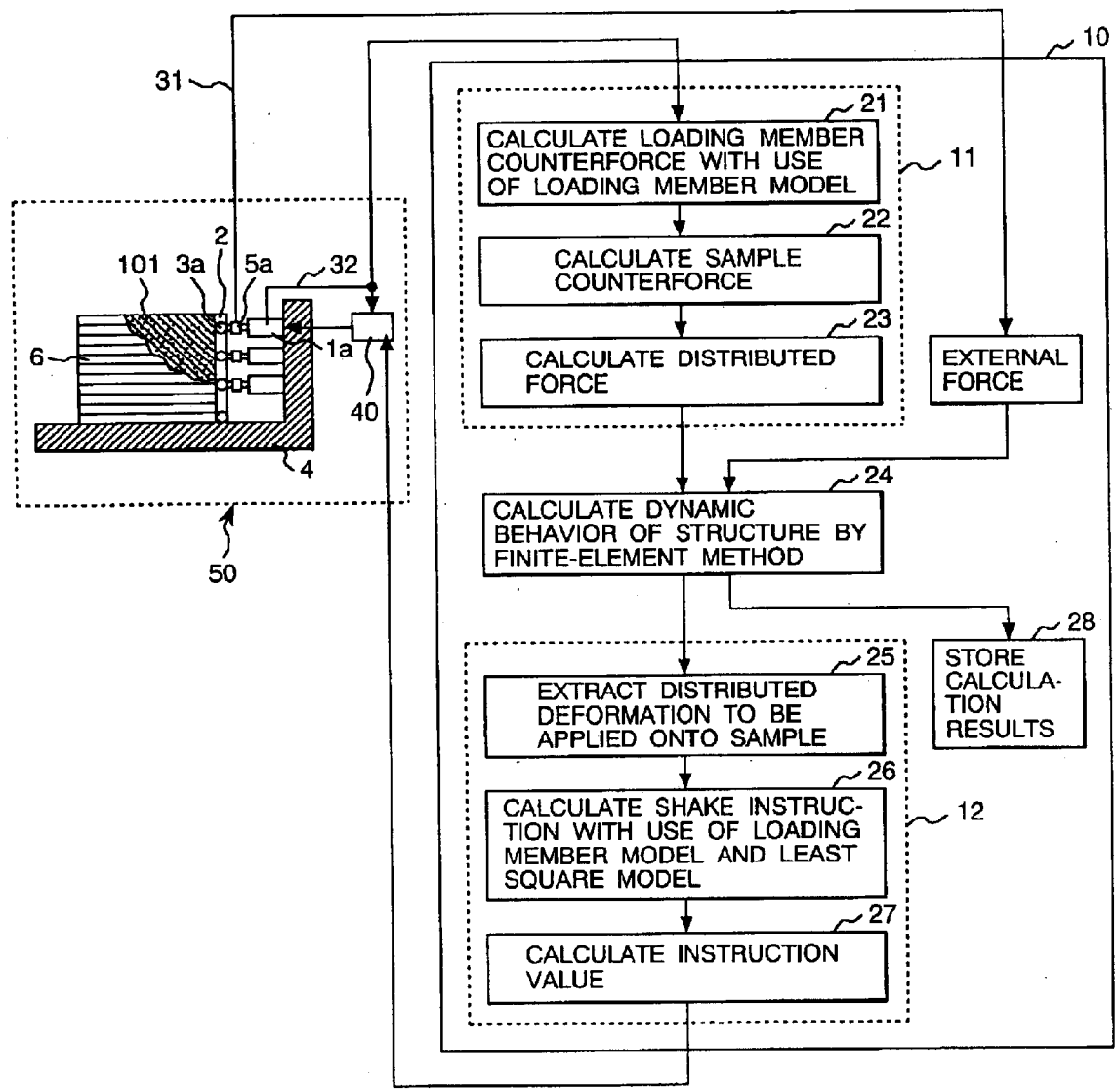
FIG. 1 is a block diagram of an embodiment of the vibration testing apparatus according to the present invention.
Figure 2:
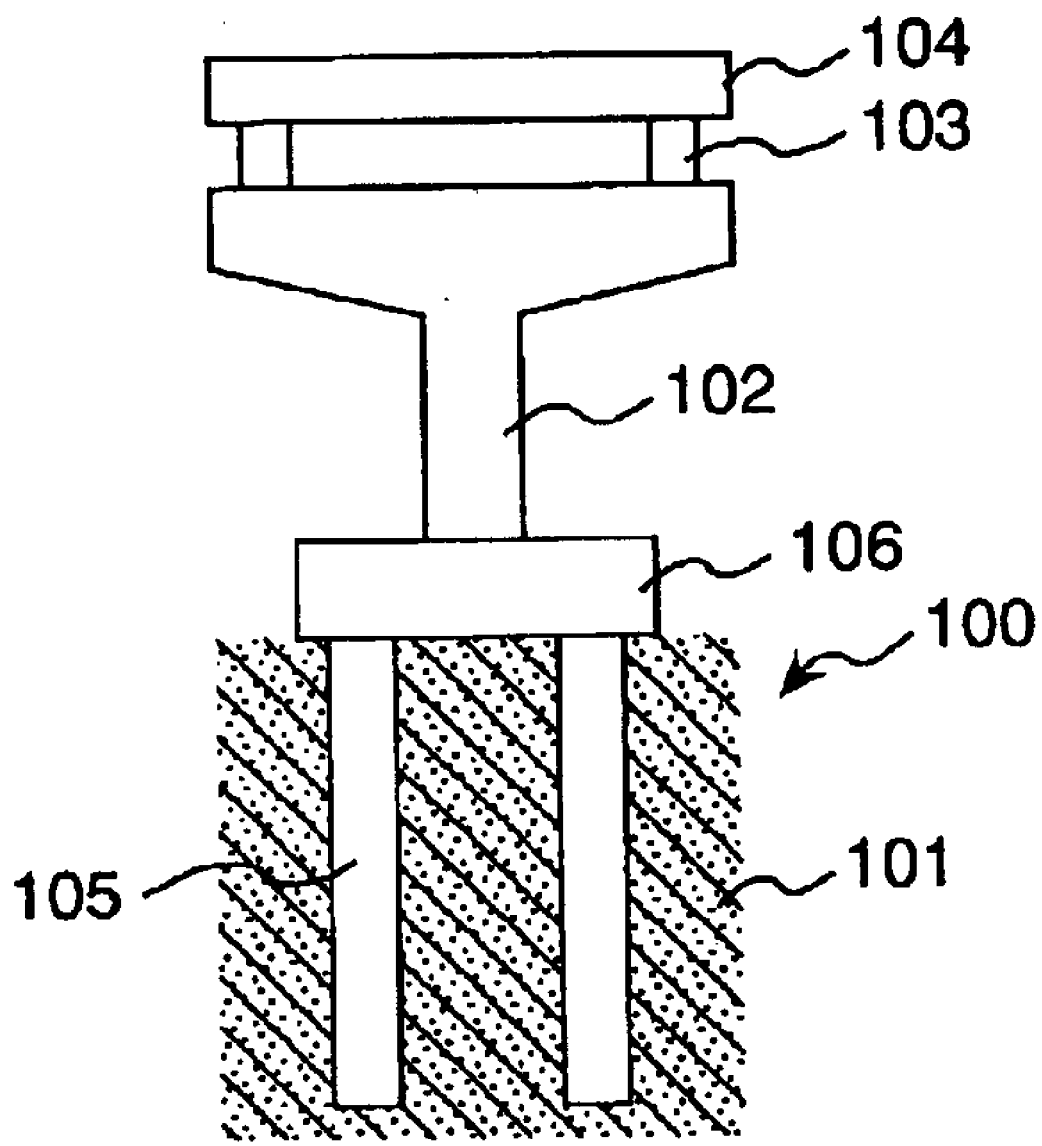
FIG. 2 shows an example of the structure which is treated by the vibration testing apparatus shown in FIG. 1.
Figure 3:
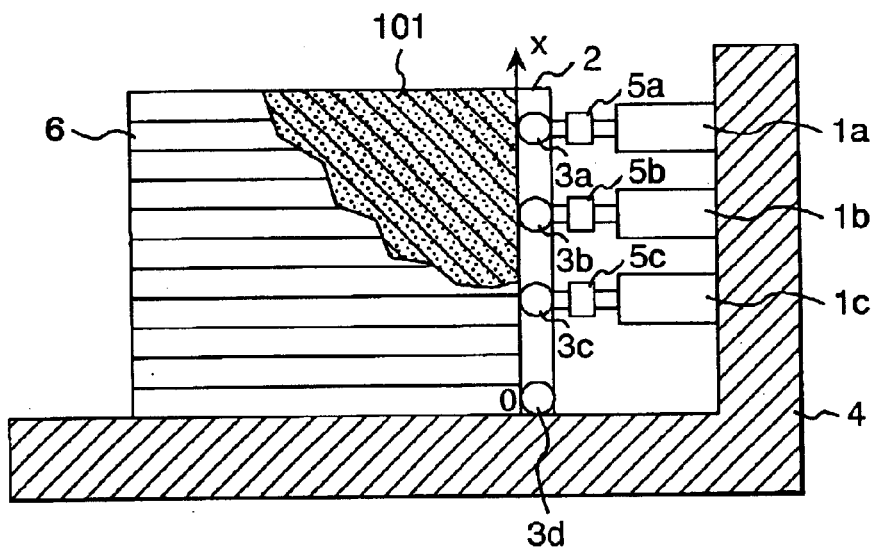
FIG. 3 is a detailed cross-section view of a sample deformation loading portion which is provided in the vibration testing apparatus shown in FIG. 1.

Hereinafter, several embodiments of a hybrid vibration testing apparatus and a testing apparatus thereof, according to the present invention, will be fully explained by referring to the attached drawings. FIG. 1 is a block diagram of the vibration testing apparatus for conducting vibration experiment on a pile buried into a soil (or foundation), which is shown in FIG. 2 in detail. FIG. 3 shows the vertical cross-section view of a vibration experiment portion in detail. On a bridge 100 as a testing target, as shown in FIG. 2, a bridge footing 102 is fixed on a footing 106. Further above the bridge footing 102, an upper structure 104 is disposed through vibration-proof devices 103. The bridge footing 102 supports the upper structure 104. The footing 106 is supported by piles 105, which are buried into the soil 101.

For the purpose of ascertaining reliability of the bridge 100 against the earthquake, a vibration response of the bridge is estimated. Among the elements or members building up the bridge 100, the characteristics can be obtained with relatively ease, of the footing 106 as the concrete structure, the bridge footing 102, the upper structure 104 and the piles 105, or the supporting members 103, since they can be identified in the materials thereof. As a result, numerical modeling can be achieved on each of those members easily.

With the vibration response of the portion of bridge footing 102, however, since the piles 105 receive the load from the soil 101, it is necessary to obtain a vibration response by adding the influences from the soil 101 thereto. Because it is difficult to obtain a numerical model of the load, which the piles 105 receive from the soil 101, because of the strong non-linear characteristic thereof, therefore the load is simulated by using an actual model. Namely, by letting a soil which is the same as the actual soil which is sample 101, deformation can be obtained, which will occur in that sample (i.e., the soil) 101 by the pile, by using a plurality of vibrators 1a, 1b and 1c. A dynamic behavior of each member of the structure, on which the numerical model can be obtained, is obtained from a numerical simulation thereof. However, the piles 105 of the actual bridge are deformed by receiving the influence from the soil 101 in a form of distributed load thereof. Also, the distributed load depends on the deformations of the piles 105. Then, the relationship between the piles 105 and the soil 101 is reproduced with as much fidelity as possible.

FIG. 3 shows the details of the sample 101 and the vibrators 1a to 1c for shaking. The sample 101 is received within a container 6, being called by a shear soil bath, which is very often used in soil vibration experiments. On one side surface of the container is attached a loading member 2, which is used for simulating the deformation applied onto the soil from the piles 105.

The loading member 2 is connected to the vibrators 1a to 1c, which are fixed onto a counterforce wall 4, being made of rigid member at one end thereof. At the connecting portions between the loading member 2 and the vibrators 1a to 1c are provided bearing shafts 3a to 3c, respectively. Those bearing shafts 3a to 3c are provided so that no moment functions onto the movable portion of the each vibrator. A lower end of the loading member 2 is fixed by a bearing shafts 3d. This bearing shaft 3d may be changed, fitting to the shape and/or the load condition of the piles 105 as an estimation target. Load cells 5a to 5c are provided on movable portions of the vibrators 1a to 1c, respectively. Those load cells 5a to 5c are provided for measuring the loads generated by the vibrators, respectively.

The loading member 2 is deformed when each of the vibrators 1a to 1c is driven; thereby also the soil 101 deforms along with the loading member 2. Herein, the rigidity of the loading member 2 is made larger than that of the soil 101. With this, it is possible to simulate the deformation to be applied onto the loading member 2 at high accuracy, by using the deformation which each of the vibrators 1a to 1c applies thereto.

Next, an explanation will be given on an example of the steps in the vibration experiment, using the above-described vibration testing apparatus. Since each of the vibrators 1a to 1c operates in a similar manner, an explanation need be given only on the vibrator 1a, for example. The vibrator 1a is a hydraulic vibrator, and receives therein a displacement sensor for measuring an amount of displacement in a movable portion. The vibrator 1a is controlled through a controller 40, upon basis of a signal obtained from the displacement sensor, which is inputted into the controller 40.

More specifically, the controller 40 drives spools of servo valves (not shown), thereby controlling an operating oil to be entered into the vibrator 1a in both a flow amount and a flow direction thereof, through a PI control, for example, when an instruction signal 33 and a measurement signal 32 of the displacement sensor are inputted into the vibrator 1a. A computer 10 is connected to the controller 40. The instruction signal 33 of the vibrator 1a is produced upon the basis of a load measurement signal 31 and the displacement measurement signal 32 by the computer 10. Further, an A/D converter is provided for digitalizing the measurement signals 31 and 32, at input portions thereof. In the similar manner, a D/A converter is provided at an output portion of the instruction signal 33.

According to the present hybrid vibration experiment method, the numerical modeling is applied onto others than a portion, which relates to the influence due to the soil 101 of the bridge, to be memorized into a memory means provided with the computer 10. The numerical modeling is assumed to be applicable to the finite-element method. In more details, the bridge model is divided into a plurality of finite-elements, and a panel point is set at a corner portion of the each element. A relationship between each the panel point is displayed by a matrix having an attenuation matrix and a rigidity matrix. An analysis program of the finite-element method is installed in the computer 10, which enables the numerical modeling and a determination of the deformation of numerical models through calculation.

Next, the steps of the vibration experiment will be explained by referring to FIG. 1.

(A) A load distribution is obtained and applied from the soil 101 to the piles 105, in a step 11. This step 11 comprises the following steps:

The amount of displacement applied from the plural number of vibrators 1a to 1c onto the loading member 2 is inputted into the computer, in a step 21. This amount of displacement is calculated out by dividing a displacement feedback signal 32 of the vibrator. The relationship can be expressed by the following equation (Eq. 1), between the amount of displacement {dm} and the load {fm} at the position where the vibrator is located on the loading member 2. Then, the load due to the loading member is calculated out from the amount of displacement obtained.

$$\{fm\}^* = [Km]\{dm\} \qquad \text{(Eq. 1)}$$

Where, {dm} in the equation (Eq. 1) is a vector which is made up with the displacement measurement signal 32 from each of the vibrators 1a to 1c, while [Km] is the rigidity matrix determined by the material and/or the structure of the loading member 2, both of which are inputted in advance. Also, {fm}* is vector of the load in each of the vibrators 1a to 1c, being generated due to the deformation of the loading member 2.

Actually, the load generated in each of the vibrators 1a to 1c is detected in the form of the load signal 31. The load {fm} is calculated out by subtracting the load {fm}* calculated out in a sub-step 22 from the vector {fm} of the load signal 31**, i.e., using the following equation (Eq. 2):

$$\{fm\} = \{fm\}^{**} - \{fm\}^* \qquad \text{(Eq. 2)}$$

A distributed load f(x) applied onto the loading member 2 is calculated out from the load $\{fm\}=\{qa,qb,qc\}T$, which is generated in the sample at the each position of the vibrators 1a to 1c, i.e., using the following equation (3):

$$f(x)=fa(x)qa+fb(x)qb+fc(x)qc \quad \text{(Eq. 3)}$$

where, qa to qc are the loads at the positions of the vibrators 1a to 1c, respectively.

Herein, "x" is a distance measured upward from the bottom surface of the loading member 2, as is shown in FIG. 3. "fa(x)" is the distributed load at the height x of the loading member 2 when the vibrator 1a applies the load by a unit thereof. This fa(x) is inputted into the computer 10 in advance. "fb(x)" and "fc(x)" are also similar to that.

However, the equation (Eq. 3) is applicable only to a case where no counterforce is generated by the deformation at the position of the lowest bearing shaft 3d. When the deformation causes the counterforce at the position of the bearing shaft 3d, it is measured in the similar manner to that on the load generating at the each position of the vibrators 1a to 1c, and is inputted into the computer 10.

(B) Next, the dynamic behaviors is calculated on the structure, which is modeled numerically (numerical modeling), after passing a minute time Δt, with using the program of the finite-element method; i.e., by using the following equation (Eq. 4). In this instance, the distributed load $\{f\}$ delivered in the step 11, as well as, the load $\{g\}$ acting as external force onto the entire structure (indicated by "EXTERNAL FORCE" in FIG. 1) act as the external force. That corresponding to the load $\{g\}$ is the inertia force due to the seismic acceleration, since the analysis is aimed at the seismic response, according to the present embodiment. This load $\{g\}$ can be obtained by storing it into the computer 10 in advance, or by inputting it from an outside of the computer 10, sequentially.

$$[M]\{y\}''+[C]\{y\}'+[K]\{y\}=\{g\} \quad \text{(Eq. 4)}$$

Where, [M], [C] and [K] indicate the mass matrix, the attenuation matrix and the rigidity matrix, respectively, and the values of those are inputted into the computer 10 in advance. $\{y\}$ is the displacement vector at the each panel point in the finite-element model. "'" indicates the differentiation in relation to the time. $\{f\}$ is the vector, which is obtained by converting the distributed load f(x) into the coordinate system of the finte-element model. The dynamic behavior is calculated out on the structure after passing the minute time Δt, by renewing the terms of the external forces $\{f\}$ and $\{g\}$ in the equation of motion (Eq. 4) at each the minute time Δt, in accordance with the scheme owned by the program of the finite-element method mentioned above. However, the equation (Eq. 4) is applicable only in a case where the numerical model can be described in the form of a liner model. The equation (Eq. 4) should be amended or changed in accordance with non-liberalization, which the program of finite-element method can deal with, in the case where the numerical model behaves only as the nonlinear model, and if the program of the finite-element method can deal with the non-linear model too.

(C) Results of calculations of $\{y\}$, etc., obtained in the step 24 are memorized into the memory and/or an external memorizing apparatus provided with the computer 10, in a step 28. The vibration testing apparatus can be also utilized as a vibration analyzing apparatus, by making reference to the results stored, after conduction of the vibration experiment, or on a way of the vibration experiment. Thus, this step 28 is not always necessary.

(D) Explanation will be given on sub-steps in a step 12 for calculating out the instruction signal. The step 12 has three (3) sub-steps 25–27. The deformation $\{x\}^*$ is extracted in the sub-step 25, which the loading member 2 should apply onto the sample 101 as the load, from the behavior of the structure for each minute time, being obtained in the sub-step 24.

The displacement amounts "da" to "dc" are obtained in the step 26, which the vibrators 1a to 1c should apply onto the loading member 2, for the purpose of achieving the actual deformation on the sample 101, with fidelity as high as possible. Those displacement amounts can be obtained by the following manner. Thus, such as the shape and the constants, etc., of the loading member 2 are memorized in the computer 10, in advance. The deformation in the loading member 2 is obtained when the vibrators 1a to 1c show a predetermined displacement, through numerical calculation by using those data of the loading member 2 memorized. The amounts of displacement can be obtained from this relationship, which are required on each of the vibrators 1a to 1c, thereby causing a predetermined deformation in each portion of the loading member 2.

For example, while giving various displacements to each of the vibrators 1a to 1c, the displacement is calculated in advance, which will be generated at each portion on the loading member, so as to be memorized in the computer 10 in the form of a database. The data, having the distribution closest to that of the displacement distribution to be tested, is selected from the memorized displacement data of the loading member, and the displacement is obtained on loading by each of the vibrators 1a to 1c at that instance, thereby conducting the shaking test. With this, it is possible to execute the hybrid vibration experiment with ease but less error therein. Also, calculation of the displacement data of the loading member through the least squares method, which are memorized in the database, in conformity with the displacement distribution to be tested, thereby obtaining the displacement amount of load by each of the vibrators 1a to 1c, enabling the hybrid vibration experiment with high accuracy.

The instruction signal 33 to the vibrators 1a to 1c is calculated out, so that the required amount of displacement can be achieved by each of the vibrators 1a to 1c. The instruction signal 33 calculated out is outputted into the controller 40. There is known a method of approaching the displacements of the vibrators 1a to 1c to the target values, gradually, while measuring them sequentially, or of shaking by the displacement after the minute time Δt, for the actual time achieved after passing Δt, as a concrete method for achieving the displacement amounts "da" to "dc". According to the present embodiment adopting such the method therein, an evaluation on the seismic response of the bridge can now be made which comprises the piles receiving the loads from the soil, with high accuracy, through conducting the steps of the above (A) to (D) mentioned above, repetitively.

Figure 4:
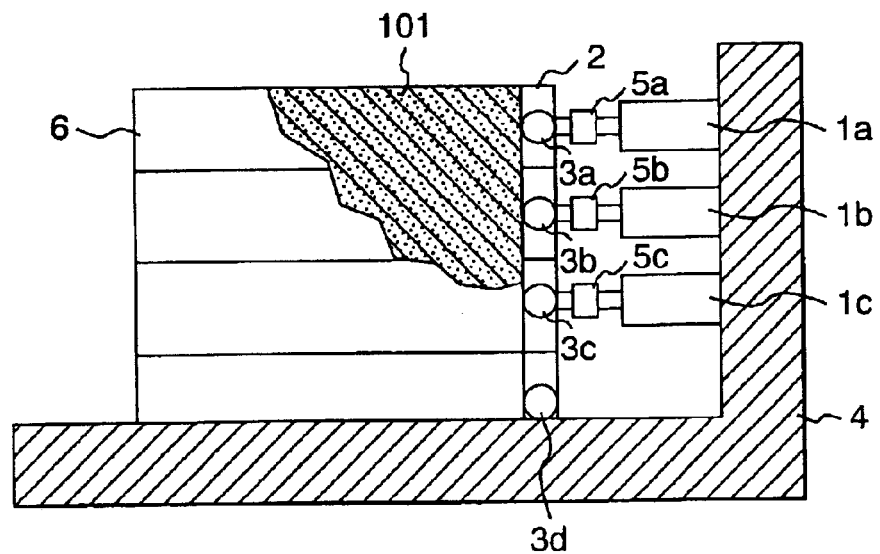
FIG. 4 is a detailed cross-section view of another example of the sample deformation-loading portion which is provided in the vibration testing apparatus shown in FIG. 1.

A variation of the embodiment mentioned above will be explained by referring to FIG. 4 in which the deformation is loaded in a method different from that in the embodiment mentioned above. Namely, the shear soil bath 6 is formed by piling up members 6a, 6b et seq. of shear soil bath in plural numbers thereof, in the vertical direction, and the vibrators 1a to 1c are positioned at the side wall portion of each stage of the shear soil bath members 6a, 6b et seq. A thin film-like member (not shown) is provided on the inner-side wall surface of the shear soil bath 6, for the purpose of preventing those shear soil bath members 6a, 6b et seq. from exceeding a predetermined amount in the displacements thereof. According to the present embodiment, it is possible to deal with the one sidewall of the shear soil bath 6 in the similar manner to that of the loading member 2 shown in the embodiment mentioned above. Also, an advantage is obtained in that the performances of the shear soil bath can be used as it is.

Figure 5A:
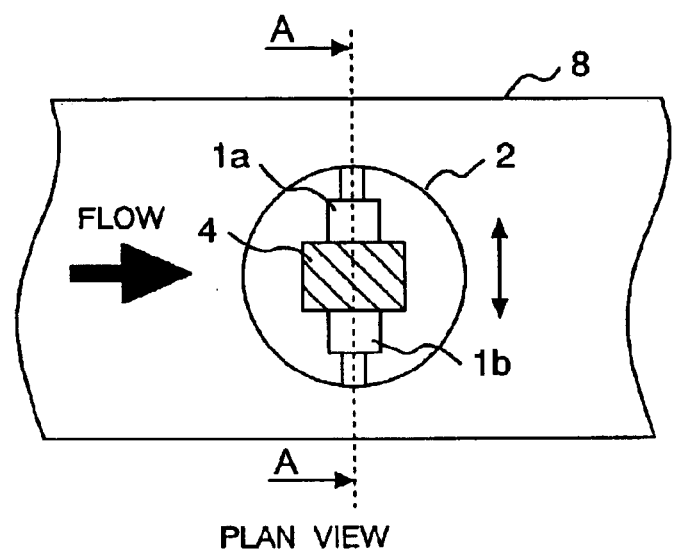
FIGS. 5(a) and 5(b) are diagrams showing another embodiment of the vibration testing apparatus according to the present invention.
Figure 5B:
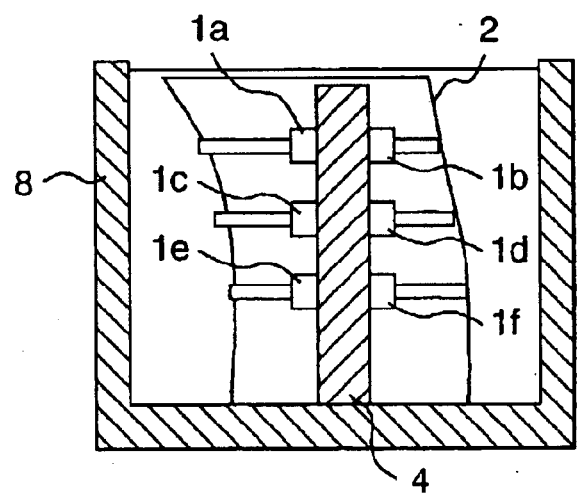

Explanation will be given on other embodiment, according to the present invention, by referring to FIGS. 5 to 7. In FIGS. 5(*a*) and 5(*b*), the testing apparatus is shown in plan view and a cross-section view thereof, for evaluation on the vibration response of the structure position in the water, in particular, when the vibration is excited on the structure as a result of an effect of flow of the water. A cylinder is positioned in the water bath 8 as to be the loading member 2. The counterforce wall 4 is received within an inside of the cylinder 2, at the central portion thereof, on the bottom surface of the water bath 8. The plurality of vibrators 1a to 1f are also received within the inside of the cylinder 2, each being fixed to the counterforce wall 4 at one end thereof, and are aligned in the vertical direction. Those vibrators 1a to if deform the cylinder 2. Estimation is made of the cylinder vibration response, which cylinder deforms when receiving the water flow within the water bath 8. The estimation system is basically same to that shown in FIG. 1.

Figure 6A:
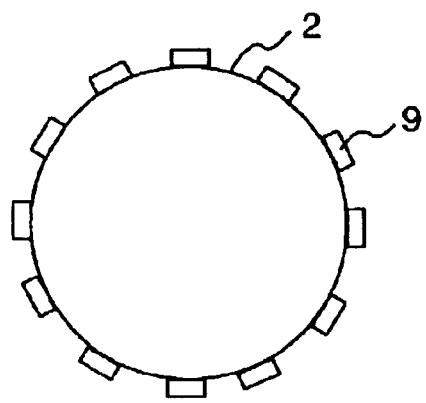
FIGS. 6(a) and 6(b) are views showing an example of a sample loaded on the apparatus shown in FIGS. 5(a) and 5(b)
Figure 6B:
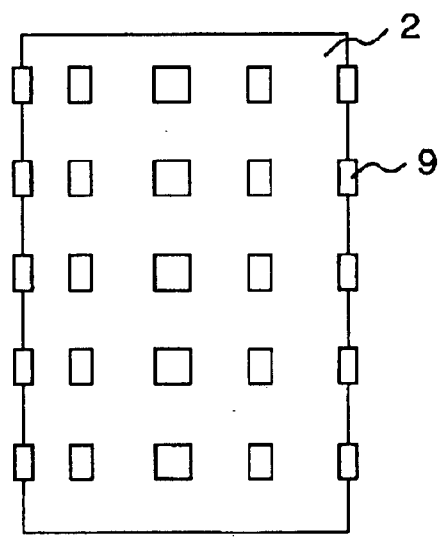
Figure 7:
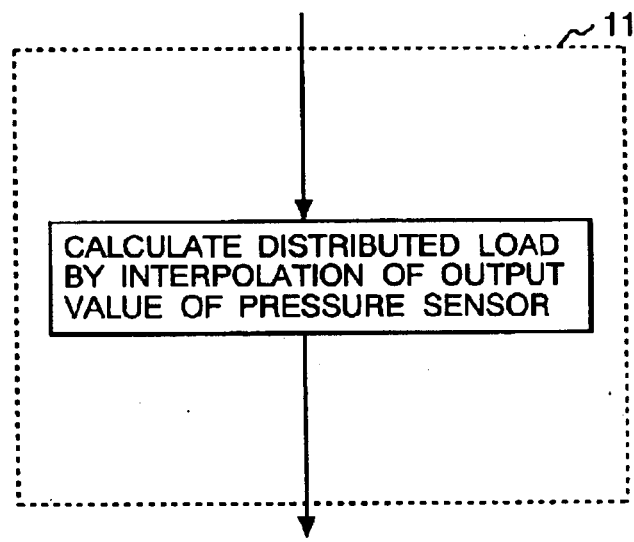
FIG. 7 shows another example of contents executed in a step 11 shown in FIG. 1.

FIGS. 6(*a*) and 6(*b*) show the disposition of a sensor for measuring the counterforce. Pressure sensors 9, 9 et seq. are pasted or adhered on an outer periphery surface of the cylinder 2 at plural numbers of peripheral and vertical positions thereof, so that the surface is divided equally. With this, the load which the cylinder 2 receives from the fluid is measured. In the present embodiment, a sample-deforming load applying portion 50 is replaced with the loading portion, which is shown in FIGS. 5(*a*) and 5(*b*). Also, the step 11 is changed into the method shown in FIG. 7, because of change in the method for measuring the counterforce. Namely, the output values of the plural numbers of pressure sensors 9, 9 et seq. are interpolated, thereby obtaining the distributed load acting upon the outer periphery surface of the cylinder 2.

However, the numerical model used in the step 24 must be one which is obtained by modeling an underwater structure. Upon executing the dynamic behavior analysis, it is possible to take the inertia due to the earthquake into consideration as the external force, or alternately to input the external force {g} of zero (0) for estimating only the influence due to the fluid. According to the present embodiment, it is possible to measure the distributed load, correctly, even in the case where the distributed load applied from the sample onto the loading member is small, compared to the load generated upon the deformation of the loading member. With this, the vibration experiment can be conducted with high accuracy.

Figure 8:
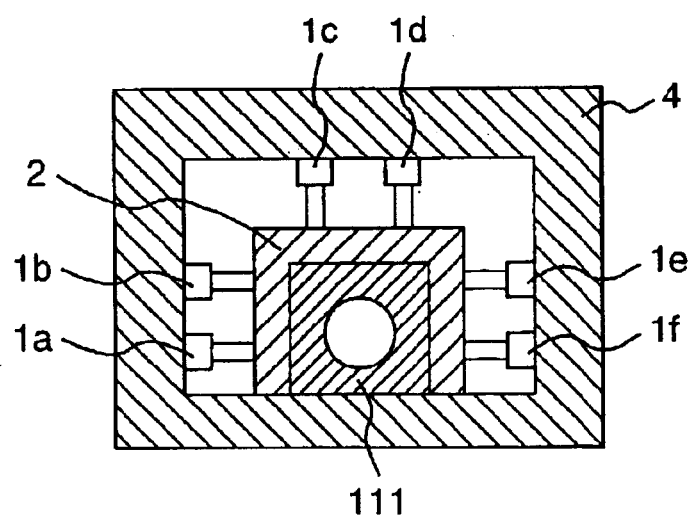
FIG. 8 is a partial cross-sectional block diagram showing a further embodiment of the vibration testing apparatus according to the present invention.
Figure 9:
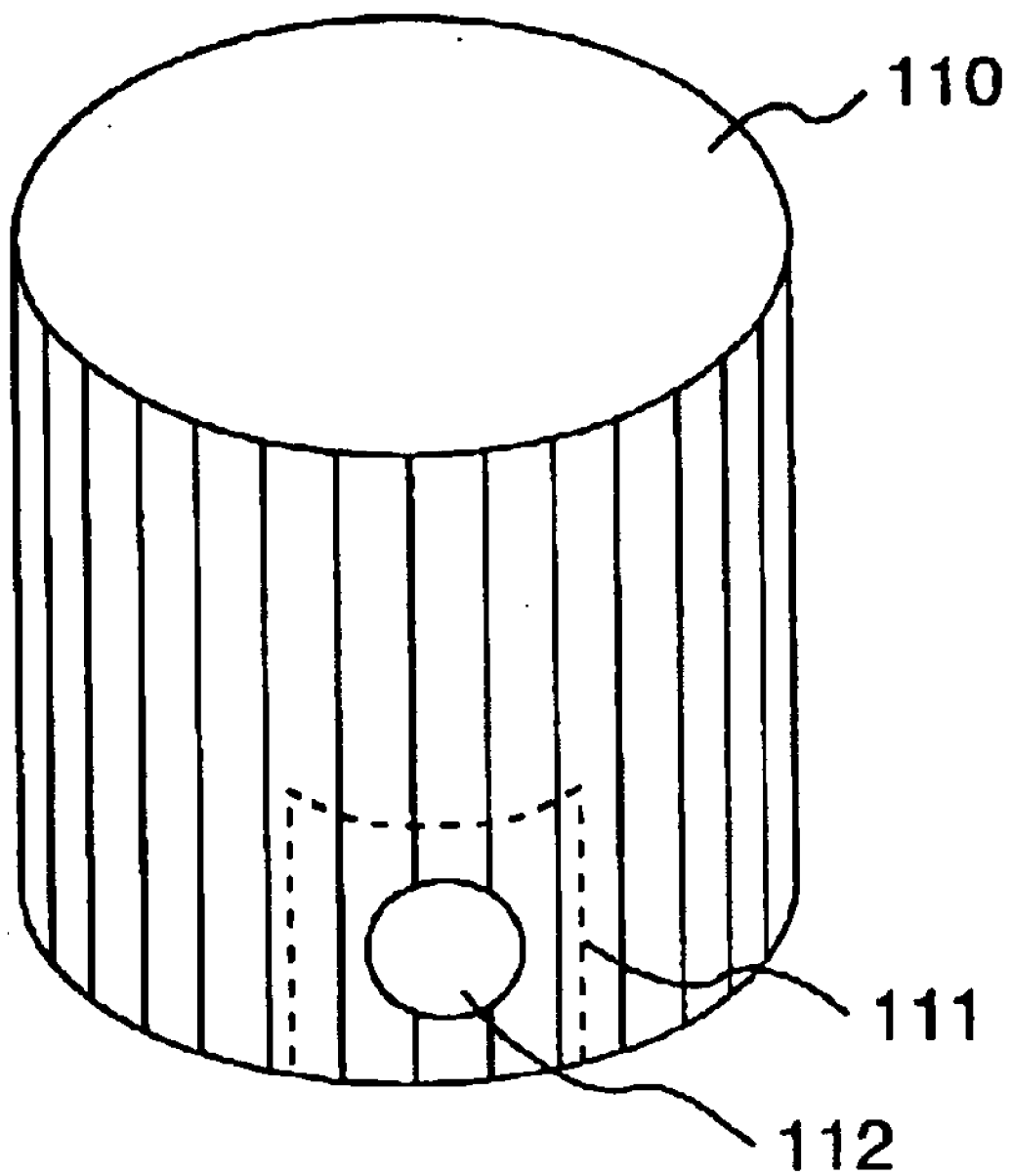
FIG. 9 is a perspective view showing an example of the sample as a target of the vibration testing apparatus according to the present invention.

Explanation will be made on a further embodiment according to the present invention, by referring to FIGS. 8 and 9. FIG. 8 shows a sample-deforming load applying portion to be used in the present embodiment, and FIG. 9 is an example of the sample to be mounted on the sample-deforming load applying portion shown in FIG. 8. The sample is a simulation of a large-scaled shell structure 110. A portion is cut out from the shell structure, at the specific part 111 thereof, such as an opening portion 112, for example, and is provided inside of the loading member 2 constructed in a gate-like shape.

Deformation is applied to the loading member 2 from the vibrators 1a to 1f. The vibrators 1a to if are fixed onto the counterforce wall 7 because of the counterforce therefrom. It is possible to apply a method of measuring the counterforce of the vibrators, or of providing the counterforce measurement sensors between the loading member 2 and the sample 111, etc., for measurement of the counterforce. In the present embodiment, it is omitted to show the counterforce measurement in the figure. The numerical model to be used in the step shown in FIG. 1 corresponds to the portion, which is applied to the shaking test from the shell structure such as the other portions, excepting that portion, which are put into the actual models.

In the vibration testing system shown in FIG. 1, the sample deforming load applying portion 50 is replaced with the sample-deforming load applying portion 50 shown in FIG. 8. Also, the step 11 shown in FIG. 1 is replaced with the step shown in FIG. 7 as necessity may dictate. Other than those, the vibration testing system which is shown in FIG. 1 is employed. With this, it is possible to conduct the vibration experiment on the large-scaled shell structure, but without manufacturing the entire structure as an actual model. However, the shear soil bath may be mounted in the vibration base, though being mounted on the basement formed with the counterforce wall in a body. In this case, it is possible to grasp the influences in more details thereof In accordance with the various embodiments mentioned in the above, since the plurality of the vibration apparatuses are provided, as well as, the loading member for transmitting the displacement of those devices to the sample, it is possible to apply the load onto the sample, which causes a distributed-type deformation, and also since the distributed counterforce generated in the sample can be used in the calculation of vibration, therefore it is possible to conduct the vibration testing method by linking the shaking test and the numeral calculation, being applicable onto the structures in a wide range, such as the structure, which cannot be divided into the points easily, the structure receiving the influences from the peripheral circumstances, etc. Further, it is also possible to obtain the apparatus, with which the analysis can be made on the vibration response of the structure with high accuracy.

Though several currently preferred embodiments are shown, the present invention should not be interpreted to be restricted only to those embodiment. The scope of the present invention should be determined by the claims appended herewith, and therefore also various structures within an inside the spirit or gist of the present invention are considered to be involved therein.

As was mentioned in the above, with the provision of the plurality of the vibrators and the loading member for transmitting the displacement due to the vibrators to the sample, it is possible to apply the load onto the sample to cause distributed type deformation, thereby achieving the analysis on the vibration response in the structure, under condition very near to the actual one.

What is claimed is:

1. A hybrid vibration testing apparatus, comprising:
   a deformation loading apparatus for deforming a sample; and
   a computer for calculating vibration response in a structure model, which is connected virtually to the sample, and for giving an instruction to said deformation loading device to cause deformation in the sample,
   wherein said deformation loading device comprises
   a loading member neighboring the sample and causing the deformation in the sample through deformation;
   vibrators for causing the deformation in the loading member, each vibrator being fixed at one end thereof; and
   counterforce measurement apparatuses for measuring the counterforce which the sample gives to said loading apparatus, wherein said computer calculates vibration response in a structure model using a distributed counterforce value detected by said counterforce measurement apparatuses and an external force applied onto the structure model, the vibration response being vibration response having a degree of freedom more than that of said vibrators, and said computer further instructs a displacement amount to each of said vibrators based upon the vibration response calculated therein.

2. A hybrid vibration testing apparatus according to claim 1, wherein said computer is configured to instruct the displacement amount to each of said vibrators, so that the deformation caused in the loading member by shaking of the vibrators coincides with the deformation of the loading member, which is included in the vibration response calculated through said structure model.

3. A hybrid vibration testing apparatus according to claim 1, wherein said counterforce measurement apparatuses have load sensors, each of which is provided between the loading member and the sample, respectively, and said computer is configured to obtain a distributed counterforce by interpolating outputs of the load sensors.

4. A hybrid vibration testing apparatus according to claim 1, wherein said counterforce measurement apparatuses have load sensors, each of which is provided between the loading member and the sample, respectively, and said computer has memory containing a loading member structure model which describes a relationship of deformation amount with respect to the load on the loading member at a connecting point between the loading member and the vibrator.

5. A hybrid vibration testing apparatus according to claim 1, further comprising means for executing at least one of storing, displaying and outputting of the vibration response calculated by said computer, during or after completion of a vibration experiment.

6. A hybrid vibration testing apparatus according to claim 2, wherein said computer is configured to calculate the displacement amount to be instructed to said vibrators using a least squares method.

7. A hybrid vibration testing method for analyzing with a computer vibration response in an entire structure by shaking a portion of the structure with using a simulated actual model and analyzing vibration response of a simulated numerical model for remaining portions of the structure, comprising:

calculating the vibration response of the numerical model at a time when at least one of external force and shaking force is applied onto the structure; and applying a load to cause a distributed displacement on a loading member, which is provided neighboring said actual model, by using vibrators, based on a computer-obtained vibration displacement at a portion neighboring said actual model.

8. A hybrid vibration testing method according to claim 7, wherein said external force is analyzed as an earthquake-caused inertia, and the vibration response to be obtained are considered to be those of seismic response caused by seismic acceleration.

9. A hybrid vibration testing method according to claim 7, wherein the distributed counterforce is obtained by inputting into computer memory a loading member structure model describing a relationship between the load and deformation amount, at positions where the vibrators are connected; calculating the counterforce generated in the loading member by said computer, using the deformation amount which is applied by each of vibrators and said loading member structure model; obtaining a difference in the load by subtracting the counterforce calculated by said computer from the load value detected by the load detector provided in each of the vibrators; and obtaining the distributed counterforce of the entire loading member which causes said distributed deformation from the load of the difference in each of said vibrators.

* * * * *